United States Patent [19]

Lundin et al.

[11] Patent Number: 4,547,481

[45] Date of Patent: * Oct. 15, 1985

[54] PROCESS FOR THE POLYMERIZATION OF ETHYLENICALLY UNSATURATED MONOMERS

[75] Inventors: Claes O. A. Lundin, Saltsjö-Boo; Berit I. Simonsson, Solna, both of Sweden

[73] Assignee: KenoGard AB, Stockholm, Sweden

[*] Notice: The portion of the term of this patent subsequent to Nov. 15, 2000 has been disclaimed.

[21] Appl. No.: 631,785

[22] Filed: Jul. 17, 1984

Related U.S. Application Data

[60] Division of Ser. No. 402,276, Jul. 27, 1982, Pat. No. 4,499,250, which is a continuation of Ser. No. 228,950, Jan. 27, 1981, abandoned.

[30] Foreign Application Priority Data

Jan. 28, 1980 [SE] Sweden .................................. 8000669

[51] Int. Cl.$^4$ .............................................. B01J 31/02
[52] U.S. Cl. ..................................... 502/160; 502/172; 502/167
[58] Field of Search ........................ 502/160, 172, 167

[56] References Cited

U.S. PATENT DOCUMENTS

| | | | |
|---|---|---|---|
| 3,825,509 | 7/1974 | Miller | 502/160 X |
| 4,039,475 | 8/1977 | Oosterwijk | 502/160 |
| 4,415,716 | 11/1983 | Lundin et al. | 502/160 X |
| 4,453,473 | 3/1984 | Tamosauskas et al. | 502/160 X |

*Primary Examiner*—Patrick P. Garvin
*Attorney, Agent, or Firm*—Fred Philpitt

[57] ABSTRACT

A process for the polymerization of ethylenically unsaturated monomers, such as vinyl chloride, wherein a solid, monomer-soluble, free-radical forming compound is used as initiator. The initiator is added to the polymerization system in the form of an aqueous dispersion which contains an ethoxylated nonionic emulsifier with an HLB-value above 15, and preferably above 17, which emulsifier does not contain cyclic inner ether bonds. Polymerizates produced according to the method have good electric insulation properties. Suitable ethoxylated nonionic emulsifiers are ethoxylated fatty acids and ethoxylated fatty alcohols. A means, suitable for polymerization of ethylenically unsaturated monomers, consists of an aqueous dispersion of a free-radical forming compound containing a nonionic ethoxylated emulsifier with an HLB-value above 15, in an amount of at least 1 percent by weight, based on the initiator, and preferably also a protective colloid such as polyvinyl alcohol. The dispersions have good stability and are easy to handle.

8 Claims, No Drawings

PROCESS FOR THE POLYMERIZATION OF ETHYLENICALLY UNSATURATED MONOMERS

This is a division of application Ser. No. 402,276, filed July 27, 1982, now U.S. Pat. No. 4,499,250, which is a continuation of Ser. No. 228,950 filed Jan. 27, 1981, now abandoned, and the benefits of 35 USC 120 are claimed relative thereto.

The present invention relates to a process for the polymerization of ethylenically unsaturated monomers, wherein solid, monomer-soluble free-radical forming compounds are used as initators. More particularly the invention relates to a process, wherein the initiator is charged to the polymerization system in the form of an aqueous dispersion containing a specific emulsifier. The invention also relates to a means suitable for carrying out the polymerization process.

Polymers of ethylenically unsaturated monomers, such as polyvinyl chloride and copolymers based on vinyl chloride, are to a great extent used for insulation of cables and other electric material. In this connection it is essential that the electric insulating power, the volume resistivity, is as high as possible in order to avoid electric losses. At polymerization of e.g. vinyl chloride in aqueous systems, protective colloids and/or emulsifiers are used to obtain the desired particle size of the polymerizate, and free-radical initiators are used to carry out the polymerization. When these chemicals are used, their effect on the properties of the produced polymerizate must be carefully considered. Above all, certain types of these additives have a detrimental effect on the volume resistivity of the polymerizate.

As solid, monomer-soluble, free-radical initiators use can be made of organic peroxides such as aromatic and aliphatic diacyl peroxides, diaralkyl peroxides and dialkyl peroxydicarbonates, mixed anhydrides of organic sulphoperacids and organic acids, and also azo compounds. It is of course possible to charge initiators of this type to the polymerization system in solid form or dissolved in organic solvents. However, these methods of feeding are not satisfactory with respect to handling and occupational environment. Therefore, development has, in the last few years, been centred on the preparation of aqueous dispersions of the solid initiators, which dispersions can be used in closed systems.

U.S. Pat. No. 3,825,509 describes a process for suspension polymerization of vinyl chloride, in which process the initiator is charged in the form of an emulsion, containing an emulsifier of the ethoxylated polyolester type, and more specifically polyoxyethylene sorbitan monolaurate, and polyvinyl alchohol. Further, dispersions of solid peroxides, wherein the emulsifier system is a combination of two or more emulsifiers, are known from the U.S. Pat. No. 4,039,475. This patent specification describes initiator suspensions, which are suitable for use in the polymerization of vinyl chloride, and which suspensions contain a combination of a nonionic emulsifier with an HLB-value not higher than 12.5 and a nonionic emulsifier with an HLB-value not lower than 12.5. Alternatively, combinations of nonionic emulsifiers with an HLB-value not higher than 12.5 and anionic emulsifiers can be used according to the patent. Ethoxylated emulsifiers have mainly been used as the nonionic emulsifiers. It is also known to use different cationic and anionic emulsifiers, as described for example in the published German patent application No. 26 29 467.

The dispersions mentioned above have varying degrees of stability and most of them do not give stable initiator dispersions, but only dispersions, which are pumpable or which are stable only for a shorter period of time. Another disadvantage of hereto known dispersion is, that the emulsifier used, to a varying extent, often impair the electric properties of the produced polymerizate, and the products can then only to a minor extent be used for example in the cable industry. Furthermore, many of the suggested emulsifiers will have a negative effect on the emulsifiers and protective colloids, which are most commonly used for polymerization, so that when using the initiator dispersions it will not be possible to use conventional polymerization recipes without modifications or without impairing the properties of the polymerizate.

It has now been found, that certain types of emulsifiers give dispersions of solid, monomer-soluble, free-radical forming initiators, which dispersions are stable on storage, easy to handle and which do not give rise to any appreciable negative effects on the electric insulation property of the produced polymerizate. Neither do the dispersions seem to have any considerable influence on the conventionally used protective colloids or emulsifiers, and modifications of the polymerization recipes can thus be avoided, when the present dispersions are used.

The present invention thus relates to a process at the polymerization of ethylenically unsaturated monomers, wherein a solid, free-radical forming compound is used as initiator and is charged in the form of an aqueous dispersion. The initiator dispersion, which is charged to the polymerization system, contains an ethoxylated nonionic emulsifier with an HLB-value above 15, which emulsifier does not contain cyclic inner ether bonds.

By HLB-value is to be understood the hydrophiliclipophilic balance as described in "The Atlas HLB-System, a time saving guide to emulsifier selection", published by Atlas Chemical Industries, Inc., 1963, and by resulting HLB-value is to be understood the HLB-value for blends of emulsifiers, which value can be calculated with respect to the weight ratio of the components, as likewise described in the mentioned publication.

The present method can be used in current known methods for the polymerization of ethylenically unsaturated monomers in aqueous systems, wherein monomer soluble initiators are used. As examples of ethylenically unsaturated polymerizable compounds can be mentioned: vinyl aromatic compounds, e.g. styrene and substituted styrenes such as p-chlorostyrene, esters of aliphatic alpha-methylene carbonic acid, preferably lower alkyl esters, e.g. methylacrylate, ethylacrylate, methyl methacrylate, ethyl methacrylate, acrylic acid nitrile, vinyl esters, e.g. vinyl acetate, vinyl halides, vinyl ethers, e.g. vinyl methylether, vinylidene chloride and lower alkenes, e.g. butadien. The present method is preferably used at polymerization of vinyl chloride or vinyl chloride and up to 20 percent by weight, based on the vinyl chloride, of copolymerizable monomers, such as alkenes, vinyl acetate, vinylidene chloride, acrylic acid and methacrylic acid, acrylates and methacrylates, acryl nitirile and methacryl nitirile, vinyl esters, etc., by known suspension and microsuspension polymerization methods.

It has surprisingly been found, that the particular emulsifier, which is used for the initiator dispersion does not have any substantial negative effect on the electric insulation power of the produced polymer, and the produced polymer satisfies the requirements, which can be set for the use thereof in electric insulating materials. The values for the volume resistivity, which are obtained when an initiator dispersion according to the invention is used, are fully comparable with those obtained when the initiator is charged in powder form, i.e. without addition of extra chemicals.

To carry out polymerization using initiator dispersion, it is also required that the dispersion has a suitable viscosity, both with respect to easy handling for the charging and to the distribution in the polymerization system. The dispersions of the invention fulfil these requirements and they also show a very satisfactory stability, and they can be prepared with high dry contents of initiator, up to about 40 percent by weight.

It has been found that it, in ordet to avoid unacceptable changes in the electric insulating power of the polymer, is essential not only to avoid the use of ionic emulsifiers in the initiator dispersions, but also that specific demands must be made on the used nonionic emulsifier.

It has been found that it is essential, that the ethoxylated nonionic emulsifier has a comparatively high HLB-value, i.e. that it has distinct hydrophilic tendencies. In order to obtain dispersions, which fulfil all the requirements, it is also essential, that the emulsifier does not contain cyclic inner ether-bonds, i.e. that it is not an anhydro derivative of polyhydric alcohols.

According to the present invention a nonionic ethoxylated emulsifier with an HLB-value above 15 is used, and this emulsifier will hereinafter be referred to as the hydrophilic emulsifier. The hydrophilic emulsifier must not contain cyclic inner ether bonds and it is suitably selected from the groups consisting of ethoxylated alkylphenols, ethoxylated fatty alcohols, ethoxylated fatty acids, ethoxylated glycol- and glycerol-fatty esters, alkylene oxide block-copolymers. The HLB-value for the hydrophilic emulsfier preferably exceeds 17. A suitable upper limit for the value is 25. Particularly suitable hydrophilic emulsifiers are the ethoxylated alkylphenols, fatty alcohols and fatty acids. The ethoxylated fatty alcohols and fatty acids are preferred, and especially the last-mentioned compounds. By ethoxylated nonionic emulsifiers is to be understood, as far as derivatives of acids and different alcohols are concerend, that they contain predominantly ethylene oxide groups, but other lower alkylene oxide groups, such as propylene oxide, may be present. Preferably all of the alkylene oxide groups are ethylene oxide groups.

Instead of one emulsifier, it is of course possible to use two or more as long as the above-mentioned requirements are met, and the resulting HLB-value for a blend of two or more hydrophilic emulsifiers exceeds 15.

In the method of the invention solid, oil-soluble radical-initiators are used and suitable such initiators are different types of solid organic peroxides, mixed anhydrides or organic sulfoperacids and organic acids, and azo compounds. Known azo compounds for initiation of polymerization are e.g. azovaleronitrile and azobisisobutyronitrile. Preferably solid organic peroxides are used and hereby is to be understood peroxides, which are stable at a temperature of about 20° C. As examples of groups of such peroxides can be mentioned aromatic and aliphatic diacyl peroxides, e.g. dibenzoyl peroxide and dilauryl peroxide, dialkyl and diaralkyl peroxides such as dicumyl peroxide, hydroperoxides, peresters, perketals, ketone peroxides, peroxydicarbonates. At the polymerization solid dialkylperoxydicarbonates are preferably used and as examples of such can be mentioned dimyristyl-, dicetyl-, distearyl-, dicyclohexyl- and di-4-tert. butylcyclohexyl-peroxydicarbonate.

The dispersions may have a solid content of initiator of up to about 40 percent by weight and the solid content suitably exceeds 15 percent by weight. The total amount of emulsifier should be at least 1 percent by weight, based on the amount of initiator. The total amount of emulsifier should not exceed 15 percent by weight. Protective colloids or thickening agents may of course be present in the dispersions.

According to the invention it has been found that stable dispersions having high solids content can be obtained by use of only one emulsifier and that a negative effect on the electric insulation power of the polymerizate is avoided, if the emulsifier fulfils the above mentioned requirements. The above mentioned hydrophilic emulsifiers may of course be blended with nonionic emulsifiers of a lipophilic character, i.e. with emulsifiers having comparatively low HLB-values. If blends with lipophilic emulsifiers are used, the lipophilic emulsifiers should have an HLB-value below 9 and they should not contain ethoxy groups, as the electric insulation power of the produced polymerizate would then be negatively influenced. As examples of emulsifiers with low HLB-values which can be used, can be mentioned the partial fatty acid esters of polyhydric alcohols having 2 to 8 carbon atoms, or anhydro derivatives of these. Suitable polyhydric alcohols or anhydro derivatives thereof comprise glycols, such as ethylene glycol, propylene glycol etc., glycerol, diglycerol and higher glycerols, polyols such as xylitol, pentaerythritol, sorbitol and anhydro derivatives of these polyols, such as sorbitan. When lipophilic emulsifiers are used in combination with the hydrophilic emulsifiers according to the invention, they should suitably have an HLB-value below 7 and, further, they should suitably not contain cyclic inner ether bonds. Preferably partial fatty acid esters of alcohols, originally having not more than three hydroxyl groups, are used, and especially suitable are the partial fatty acid esters of glycerol. If the hydrophilic emulsifiers are blended with lipophilic emulsifiers as above the resulting HLB-value should be within the range of 11–17.

For polymerization using the present initiator dispersions the amount of initiator is calculated in the same manner as for polymerization using solid initiators which are not in the form of dispersions, and this means that the amount of initiator generally is within the range of 0.01 to 2 percent by weight based on the weight of the monomer. Im polymerization with the present dispersions conventionally used polymerization recipes can be used, and other polymerizations agents can be used in accustomed amounts.

The invention also relates to a means, suitable for use in polymerization of ethylenically unsaturated monomers in aqueous systems. The means is an aqueous dispersion of a solid, monomer-soluble, free-radical forming compound, suitably a solid organic peroxide and preferably a solid dialkyl peroxydicarbonate, which dispersion contains at least an hydrophilic emulsifier, as hereinbefore defined, in an amount of at least 1 percent by weight based on the free-radical forming initiator. The total amount of emulsifier should not exceed 15 percent by weight and the amount is suitably within the range of 1 to 10 percent by weight and preferably within the range of 1 to 5 percent by weight.

The hydrophilic emulsifier in the dispersions have an HLB-value above 15 and preferably above 17. This emulsifier must not contain cyclic inner ether bonds, i.e. it must not be of the ethoxylated sorbitan-derivative type. The hydrophilic emulsifier is suitably selected from the groups consisting of ethoxylated alkylphenols, ethoxylated fatty alcohols, ethoxylated fatty acids, etohoxylated glycol- and glycerol fatty esters and alkylene oxide block-copolymers. In the five first-mentioned groups alkyl and fatty rests, respectively, are present and hereby is to be understood alkyl groups containing at least 8 carbon atoms and fatty rests containing at least 8 carbon atoms. The latter preferably contain between 8 and 22 carbon atoms and can be saturated or unsaturated. The last-mentioned group, the block-copolymers, consists of polyoxyethylene-polyoxypropylene glycol block-copolymers and can more specifically be defined as condensates of ethylene oxide and a hydrophobic base, formed by condensation of propylene oxide and propylene glycol. At least 40 percent by weight of the molecular weight of the block-copolymers should be made up from ethylene oxide units. Suitable hydrophilic emulsifiers are ethoxylated alkylphenols, ethoxylated fatty alcohols and ethoxylated fatty acids. The two last-mentioned groups are preferred and especially preferred are the ethoxylated fatty acids. This group does of course comprise as well reaction products of fatty acid and ethylene oxide, as of fatty acid and polyethylene glycol, the last-mentioned reaction products are often referred to as polyethylene glycol esters, and both mono- and di-fatty acid esters are included.

As has been mentioned above, the dispersions may also contain an nonionic emulsifier with an HLB-value below 9, and preferably below 7. This emulsifier must not be ethoxylated and when blends of hydrophilic and lipophilic emulsifiers are used, care should be taken that the resulting HLB-value for the blend is within the range of 11–17.

The dry content of initiator in the dispersions can reach about 40 percent by weight and is generally above 15 percent by weight. The amount of emulsifier is of course suited to the amount of initiator, and it should generally not exceed 15 percent by weight, as it has been found that the viscosity otherwise might be negatively influenced.

The dispersions according to the invention should have a comparatively low viscosity and thereby be easy to handle. The viscosity should not exceed 1000 cp (measured with Brookfield viscosimeter RVT, spindle 3, 100 r.p.m., at a temperature of 20° C.) and the viscosity is generally below 150 cp. The dispersions are further very stable and this means that the viscosity of the dispersions does not increase substantially during a longer period of storing. Neither do the dispersions, after a longer period of storing, show phase separation of such a kind that they cannot be used for polymerization.

It is suitable to incorporate substances which function as thickeners and/or protective colloids in the dispersions, in order to prevent that the initiators in the aqueous dispersion can no longer be homogenously distributed in the continuous phase, should phase separation have occurred. These substances are preferably incorporated in most cases, and in such amounts as to prevent phase-separation to the greatest possible extent.

Examples of substances which are suitable for this purpose are synthetic and natural polymers such as polyvinyl alcohol, which may be partially hydrolyzed, polyvinylpyrrolidone, polyacrylic acid, and acrylic acid copolymerizates with acrylic amide or acrylic esters, water-soluble cellulose derivatives such as hydroxyethyl and hydroxypropyl cellulose, methyl cellulose and carboxymethyl cellulose, gelatin, starch etc. The amounts of protective colloid is chosen with respect to the desired viscosity of the dispersion, with respect to the emulsifiers and the initiator. The amount is suitably within the range of 0.05–10 percent by weight, based on the dispersion, and preferably within the range of 0.2–5 percent by weight. Polyvinyl alcohol or water-soluble cellulose derivatives are preferably used.

The dispersions of the invention are prepared in a known manner by mixing and homogenizing the components by means of known equipment, such as colloid mills, pressure homogenizers, ball mills, ultrasonic homogenizers etc. As peroxides are susceptible to higher temperatures, the temperature at mixing and homogenizing these should not exceed 20° C. to prevent decomposition.

The invention is further illustrated in the following examples which, however, are not intended to limit the same. Parts and percent relate to parts by weight and percent by weight unless otherwise stated.

EXAMPLE 1

20 g of dicetyl peroxydicarbonate were added to 80 g of water solution containing 0.8 g of polyvinyl alcohol and 1.0 g of an ethoxylated oleic acid with an HLB-value of 18.5.

The mixture was dispersed by means of an Ultraturrax ® at 1000 r.p.m. and was then homogenized by means of an Ultrasonic homogenizer at a temperature of about 20° C. and a pressure of about 1000 kPa.

The viscosity of the obtained dispersion was 55 cp, measured with a Brookfield viscosimeter, spindle 3, at 100 r.p.m.

Only a slight increase in viscosity and a slight phase separation could be noticed after 2 months storage and this means that the dispersion had a good storage stability.

EXAMPLE 2

30 g of dilauryl peroxide were added to 70 g of a water solution containing 0.6 g of ethylhydroxy ethylcellulose and 0.7 g of a ethoxylated stearic acid with an HLB-value of 17.0.

A dispersion was prepared in the same manner as in Example 1, and the viscosity of this dispersion was 71 cp. A slight separation was noticed after 2 months storage, but the peroxide could easily be uniformly distributed in the aqueous phase again by shaking.

EXAMPLE 3

20 g of dicetyl peroxydicarbonate were added to 80 g of a water solution containing 0.5 g of hydroxypropyl methylcellulose and 1.5 g of ethoxylated stearic acid with an HLB-value of 16.5.

A dispersion was prepared in the same manner as in Example 1 and the viscosity of the dispersion was 69 cp. The dispersion had good storage stability.

EXAMPLE 4

25 g of dicetyl peroxydicarbonate were added to 75 g of a water solution containing 0.5 g of hydroxypropyl methylcellulose and 0.5 g of ethoxylated stearic acid with an HLB-value of 18.9.

A dispersion was prepared in the same manner as in Example 1 and the viscosity of this dispersion was 65 cp. The dispersion showed good storage stability.

EXAMPLE 5

30 g of dicetyl peroxydicarbonate were added to 70 g of a water solution containing 0.4 g of hydroxypropyl methylcellulose and 0.8 g of ethoxylated stearyl alcohol with an HLB-value of 16.5.

A dispersion was prepared in the same manner as in Example 1 and the viscosity of this dispersion was 91 cp. The dispersion had good storage stability.

EXAMPLE 6

6300 g of water, 5 g of sorbitan monolaurate, 4 g of hydroxypropyl methylcellulose and different initiator dispersions according to the invention, an initiator dispersion for comparison and initiator in solid form, respectively, were introduced into a 15 l steel reactor. The respective initiator dispersions were charged in an amount corresponding to 3 g of dry initiator. The agitation speed in the system was 415 r/min. and the temperature was 40° C. 5500 g of vinyl chloride were charged after evacuation, and the system was heated to 55° C.

The polymerization was stopped after about 8 hours, when the pressure was 500 kPa. Unreacted vinyl chloride was blown off and the polymerizate was dewatered and dried.

200 g of the produced polymerizates were mixed with 16 g of tribasic lead sulphate and 100 g of dioctylphtalate. The mixtures were rolled to a fell for 10 minutes and thereafter pressed into plates at 160° C. and conditioned on a water bath at 23° C. for 4 hours. The volume resistivity was then measured by means of a Radiometer IM6 megohmmeter.

The following dispersions were used in the tests described above:

(a) A dispersion according to Example 4
(b) A dispersion according to Example 5
(c) Comparative example. A dispersion of 17 g of dicetyl peroxydicarbonate, 0.5 g of hydroxypropyl methylcellulose and 0.5 g of ethoxylated nonylphenol, with an HLB-value of 13.3, in 82 g of water, the dispersion having been prepared in the same manner as in Example 1.

A polymerizate, produced and treated in the same manner as above but for which the same amount of dicetyl peroxydicarbonate had been added to the polymerization system in powder form, was used as a reference in each test.

| Dispersion | Volume resistivity $\times 10^{10}$ ohm · m |
| --- | --- |
| a | 53 |
| reference | 52 |
| b | 49 |
| reference | 52 |
| c, comparative | 15 |
| reference | 55 |

We claim:

1. An aqueous dispersion of a solid, monomer-soluble, free-radical forming initiator, which dispersion is suitable for the polymerization of vinyl chloride monomers or vinyl chloride and up to 20% by weight, based on the vinyl chloride, of copolymerizable monomers in aqueous systems, said initiator dispersion containing an emulsifier consisting essentially of an ethoxylated nonionic emulsifier with an HLB-value above 15, which ethoxylated nonionic emulsifier is at least one ethoxylated fatty alcohol or at least one ethoxylated fatty acid, in an amount of at least 1 percent by weight based on the initiator.

2. A dispersion according to claim 1 wherein the ethoxylated nonionic emulsifer has an HLB-value above 17.

3. A dispersion according to claim 1 which contains 0.05 to 10 percent by weight, based on the dispersion of a thickening agent.

4. A dispersion according to claim 2 wherein the initiator is an organic peroxide.

5. A dispersion according to claim 3 wherein the initiator is an organic peroxide.

6. A dispersion according to claim 2 which contains 0.05 to 10% by weight, based on the dispersion, of a thickening agent.

7. A dispersion according to claim 6 wherein the initiator is an organic peroxide.

8. An aqueous dispersion according to claim 1 wherein the initiator is a dialkylperoxydicarbonate.

* * * * *